April 1, 1969　　　　S. P. MITOFF　　　　3,436,269
ELECTRICAL DEVICE COMPRISING METAL OXIDE-CONTAINING
SOLID ELECTROLYTE AND ELECTRODE
Filed June 10, 1965
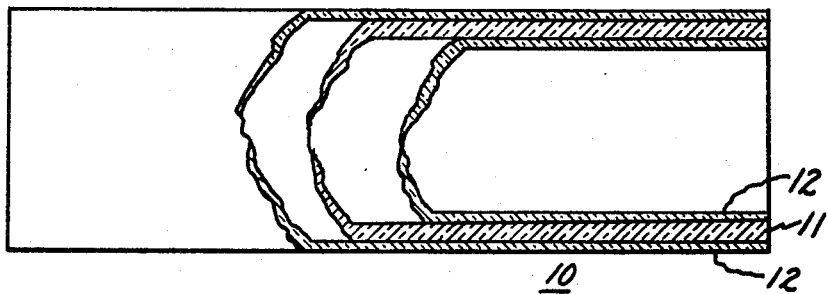
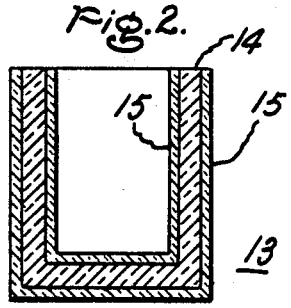 
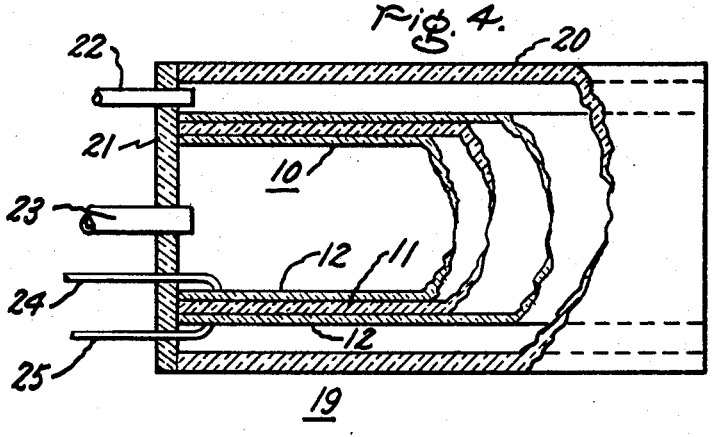
Inventor:
Stephan P. Mitoff,
by Paul R. Webb, II
His Attorney.

United States Patent Office 3,436,269
Patented Apr. 1, 1969

3,436,269
ELECTRICAL DEVICE COMPRISING METAL OXIDE-CONTAINING SOLID ELECTROLYTE AND ELECTRODE
Stephan P. Mitoff, Elnora, N.Y., assignor to General Electric Company, a corporation of New York
Filed June 10, 1965, Ser. No. 462,851
Int. Cl. H01m 27/22
U.S. Cl. 136—86        4 Claims

ABSTRACT OF THE DISCLOSURE

Nonporous electrode construction for a high temperature fuel cell is described wherein the electrode displays mixed conductivity (ionic and electronic) when in use, because of its composition. The composition consists of a solid stabilized oxide-ion material having at least partially dissolved therein from 2 weight percent to 40 weight percent of uranium dioxide and a metal oxide selected from the group consisting of iron oxide, cobalt oxide, nickel oxide, titanium oxide, zinc oxide, titanium oxide-iron oxide, zinc oxide-iron oxide, and zinc oxide-lead oxide.

---

This invention relates to high temperature fuel cells, and more particularly to composite articles providing electrode-electrolyte-electrode structures of electrolyte-electrode structures for such high temperature fuel cells.

Fuel cells, operable at high temperatures in the range of 1000° C. to 1200° C., are shown in U.S. Letters Patent 3,138,487 and 3,138,490 which are assigned to the same assignee as the present application. Each of these fuel cells employs a solid oxygen-ion conducting electrolyte, solid electrodes, fuel and oxidant supplies for the respective electrodes, and electrical leads connected to the respective electrodes. Such fuel cells provide a low voltage direct current power source on a continuous basis. Such cells have application in various chemical process industries, such as the manufacture of aluminum and the electrorefining of copper. Furthermore, these cells can be employed to operate direct current motors.

In a fuel cell of the above type, it would be desirable to minimize the amount of silver employed as the cathode; to minimize the exposed surface area of the silver, and to provide an electrode which functions as either a cathode or anode.

In copending applications, Ser. No. 462,852, Fullman et al., filed June 10, 1965, and Ser. No. 462,849, White, filed June 10, 1965, there are disclosed and claimed improved composite articles providing electrode-electrolyte-electrode structures or electrolyte-electrode structures for high temperature fuel cells. The present invention is directed to a further improved composite article of the above types.

It is an object of my invention to provide an improved composite article forming an electrode-electrolyte-electrode structure for a high temperature fuel cell.

It is another object of my invention to provide an improved composite article forming an electrolyte-electrode structure for a high temperature fuel cell.

It is a further object of my invention to provide an improved high temperature fuel cell which employs an improved composite article.

In carrying out my invention in one form, a composite article comprises a solid oxygen-ion conducting member, and a nonporous adherent electrode on one surface of the member, the electrode consisting of an oxygen-ion conducting metal oxide, at least partially dissolved therein, 2 weight percent to 40 weight percent of uranium dioxide and, at least partially dissolved therein, a metal oxide selected from the group consisting of iron oxide, cobalt oxide, nickel oxide, titanium oxide, zinc oxide, titanium oxide-iron oxide, zinc oxide-iron oxide, and zinc oxide-lead oxide.

These and various other objects, features and advantages of the invention will be better understood from the following description taken in connection with the accompanying drawing in which:

FIGURE 1 is a sectional view of a composite article embodying my invention;
FIGURE 2 is a sectional view of a modified composite article;
FIGURE 3 is a sectional view of another modified composite article; and
FIGURE 4 is a sectional view of a high temperature fuel cell which employs a pair of solid electrodes embodying my invention.

In FIGURE 1, a composite article or bdoy is shown generally at 10 which comprises a solid oxygen-ion conducting electrolyte 11 in the form of a hollow tubular member of stabilized zirconia, and a pair of solid electrodes adhering tightly on opposite surfaces of electrolyte 11. Each electrode, which is preferably nonporous, consists of an oxygen-ion conducting metal oxide, at least partially dissolved therein, 2 weight percent to 40 weight percent of uranium dioxide and, at least partially dissolved therein, a metal oxide selected from the group consisting of iron oxide, cobalt oxide, nickel oxide, titanium oxide, zinc oxide, titanium oxide-iron oxide, zinc oxide-iron oxide, and zince oxide-lead oxide.

While both of the above electrodes 12 are described above as being identical, one of these electrodes is employable as the anode and a different cathode is provided as a tightly adherent layer on the opposite surface of electrolyte 11. For example, the cathode consists of lithiated nickel oxide, doped tantalum pentoxide, or a solid, porous oxygen-ion conducting metal oxide matrix with silver impregnated in and filling the pores thereof. If an electrode 12 is used as the cathode, another anode material is employable therewith. For example, the anode consists of intimate dispersion of nickel in a compatible solid oxygen-ion conducting material; or a solid oxygen-ion conducting metal oxide matrix, and silver impregnated in and filling the pores thereof. The cathode or anode is positioned on either the inner or outer surface of electrolyte 11.

In FIGURE 2 of the drawing, there is shown a modified composite article or body 13 in the form of a container which comprises a solid oxygen-ion electrolyte 14 and a pair of solid electrodes 15 adhering tightly on opposite surfaces of electrolyte 14. Each electrode 15 has the same composition as electrodes 12 in FIGURE 1 of the drawing.

In FIGURE 3 of the drawing, there is shown another modified composite article 16 in the form of a plate. Article 16 comprises a solid oxygen-ion conducting electrolyte 17, and a pair of solid electrodes 18 adhering tightly on opposite surfaces of electrolyte 17. The composition of each electrode 18 is identical with the composition of electrodes 15 in FIGURE 2 and electrodes 12 in FIGURE 1 of the drawing.

In FIGURE 4 of the drawing, there is shown a high temperature fuel cell 19 which includes composite article 10 of FIGURE 1 of the drawing. Composite article 10 comprises a solid oxygen-ion conducting electrolyte 11 in the form of a hollow tubular member of stabilized zirconia, and a pair of solid electrodes 12 adhering tightly on opposite surfaces of electrolyte 11. Electrodes 12 shown in FIGURE 4 are identical in composition with electrodes 12 as shown in FIGURE 1 of the drawing. Electrode 12 on the exterior surface of electrolyte 11 functions as a cathode while electrode 12 on the interior surface of electrolyte 11 functions as the anode. An outer, hollow member 20 such as a tube of alumina surrounds and is spaced from the exterior surface of cathode 12 to provide an air passage between cathode 12 and the inner surface of tube 20. A cover 21, for example, the same material as tube 20, is provided at the inlet end of tube 20.

An inlet tube 22 extends into the air passage between cathode 12 and tube 20 to introduce a gaseous oxidant containing molecular oxygen from a source (not shown) into this passage. A second tube 23 is provided through cover 21 and communicates with the space defined by the interior wall of anode 12 within electrolyte 11. Tube 23 introduces a fuel, such as hydrogen, from a source (not shown) into this space. A conducting metallic lead 24, for example, of nickel, extends through cover 21 and is in contact with anode 12. A conducting metallic lead 25, for example, of platinum or palladium, extends through cover 21 and is in contact with cathode 12 of the cell. The free ends of leads 24 and 25 are connected to apparatus, such as an electric motor (not shown), being operated by the cell. While both electrodes of this cell are shown and described as having the above identical electrodes to provide a suitable high temperature fuel cell, a different cathode or anode is suitable as was described previously.

A very satisfactory composite article for a high temperature fuel cell operable above 600° C. is provided by a solid oxygen-ion conducting member with one or both electrodes consisting of an oxygen-ion conducting metal oxide, at least partially dissolved therein, 2 weight percent to 40 weight percent of uranium dioxide and, at least partially dissolved therein, a metal oxide selected from the group consisting of iron oxide, cobalt oxide, nickel oxide, titanium oxide, zinc oxide, titanium oxide-iron oxide, zinc oxide-iron oxide, and zinc oxide-lead oxide.

I found that such an electrode is a mixed conducting oxide electrode which provides both ionic and electronic conductivity. The oxygen-ion conducting metal oxide provides the ionic conductivity while solution in it of uranium dioxide and a metal oxide from the above group provide electronic conductivity. The preferred electrode structure is non-porous. However, the porosity of the electrode structure is not critical to its operation. The improved composite article of my invention is employable in the form of a hollow tubular member, a flat plate or a container.

The preferred amount of uranium dioxide to be employed in the electrode structure is from 2 weight percent to 40 weight percent of the electrode structure. From the above metal oxide group, I prefer to employ iron oxide for electronic conductivity in addition to the uranium dioxide. I found that the preferred range for iron oxide, which includes $Fe_3O_4$, FeO and $F_2O_3$ in such an electrode, is from 2 weight percent to 20 weight percent $Fe_3O_4$ or an equivalent amount of iron introduced as $F_2O_3$, or FeO in the electrode. The preferred oxygen-ion conducting metal oxide in my electrode structure and for my electrolyte member is solid stabilized zirconia. However, other solid oxygen-ion conducting metal oxides such as doped thoria are satisfactory for incorporating electronically conductive metal oxide therewith.

Solid stabilized zirconia, which is a solid oxygen-ion conducting electrolyte material, is a compound with a cubic crystal structure consisting of zirconia to which is added at least one or a combination of several specific oxides such as calcium oxide, yttrium oxide, or a mixture of rare earth oxides. For example, the initial preferred solid zirconia material is stabilized with 14 molecular percent calcium oxide. Other compositions of stabilized zirconia, which are employable for the oxygen-ion member and as the oxygen-ion conducting metal oxide in the electrode, are discussed in "Oxide Ceramics" by Ryshkewitch, Academic Press, 1960, particularly on pages 354, 364 and 376 thereof.

Solid doped thoria is also a solid oxygen-ion conducting metal oxide which consists of thoria to which is added at least one or a combination of several specific oxides such as calcium oxide, yttrium oxide, or a mixture of rare earth oxides. For example, a solid doped thoria consists of thoria which is doped with the addition of 4 molecular percent calcium oxide to increase its oxygen-ion conductivity.

An efficient stable fuel cell is constructed which comprises a solid oxygen-ion conducting material as the electrolyte, an electrode in contact with one surface of the electrolyte, means for supplying a gaseous oxidant containing molecular oxygen to the electrode, a second electrode in contact with the opposite surface of the electrolyte, means for supplying a fuel to the second electrode, and at least one of the electrodes consisting of an oxygen-ion conducting metal oxide, at least partially dissolved therein, 2 weight percent to 40 weight percent of uranium dioxide and, at least partially dissolved therein, a metal oxide selected from the group consisting of iron oxide, cobalt oxide, nickel oxide, titanium oxide, zinc oxide, titanium oxide-iron oxide, zinc oxide-iron oxide, and zinc oxide-lead oxide.

In a fuel cell, a gaseous oxidant containing molecular oxygen is supplied during cell operation to the electrode which functions as the cathode. Fuel is supplied during cell operation to the electrode functioning as the anode. Either or both of these electrodes is a mixed conducting oxide electrode as described above.

In the preparation of the composite article shown in FIGURES 1, 2 and 3 in the drawing, the solid oxygen-ion conducting electrolyte of stabilized zirconia is prepared from zirconia powder to which has been added approximately 14 molecular percent calcium oxide. The material is formed into a hollow tubular member, a container or a flat plate shown in FIGURES 1, 2 and 3. If desired, the solid stabilized zirconia can be purchased commercially. The mixed conducting oxide electrode is formed on one surface or a pair of such electrodes are formed on both surfaces of the solid stabilized zirconia electrolyte to provide a composite article. For example, zirconia powder, which has been stabilized by the addition of 13.75 weight percent of yttria, has added thereto 2 weight percent to 20 weight percent of iron oxide powder, such as $Fe_3O_4$, and 2 weight percent to 40 weight percent of uranium dioxide, which powders are then mixed and ground together. This mixture is then calcined at 1350° C. which results in a partially sintered product. This partially sintered produce is reground to provide a powder. The reground powder is made into a slurry with a 5 percent aqueous solution of polyvinyl alcohol.

The slurry is then painted onto the inner surface, outer surface, or onto both surfaces of the stabilized zirconia electrolyte, such as the hollow tubular member shown in FIGURE 1 of the drawing. An electrically continuous network of metallic electrical conductors might be placed adjacent to one or both surfaces of the stabilized zirconia electrolyte so that it is embedded in the slurry to promote collection of current from the electrodes of a complete fuel cell. An assembly of the solid stabilized zirconia electrolyte with the slurry painted thereon is then dried, as for example, by infra-red heating to remove moisture and to form a composite article. This composite article is then assembled with other components as described above to form a fuel cell 19 as shown in FIGURE 4 of the drawing.

Heat, such as waste heat, is supplied from a source (not shown) to fuel cell 19 to raise the temperature of electrolyte 11 and electrodes 12 of cell 19 to a preferred temperature of 1350° C. to sinter the composite article. If desired, such heating is done prior to assembly of fuel cell 19. If the sintering of composite article 10 is done in cell 19, the temperature is, if desired, changed for fuel cell operation to a different temperature above 600° C. A gaseous oxidant containing molecular oxygen, such as air, is supplied through tube 22 to the air pasage between cathode 12 and the interior surface of tube 19. A gaseous fuel such as hydrogen is supplied through tube 23 to the chamber defined by the interior of electrode 12, the anode. The reaction at the surface of the cathode is as follows:

(1) $O_2 + 4e \rightarrow 2O^=$

The oxygen ions move through the cathode 12 and electrolyte 11 to combine with hydrogen in accordance with the following reaction at the surface of the anode.

(2) $H_2 + O^= \rightarrow H_2O + 2e$

The electrons, which are given up at the anode, are conducted through lead 24 to apparatus, for example, an electric motor (not shown), being operated while oxygen at the cathode combines with the returning electrons. Water vapor, which is generated at the anode, is released through the opening at the right-hand end of the cell to the atmosphere.

Examples of composite articles and high temperature fuel cells embodying my invention are as follows:

Fuel cells, which are described below in Tables I, II and III, were set up in accordance with FIGURE 4 of the drawing. The components of each of these cells were formed and assembled as disclosed above in the description of these components.

In Table I, the anode for cells Nos. 1, 2 and 3 each consists of stabilized zirconia, at least partially dissolved therein, a specific weight precent of uranium dioxide and, at least partially dissolved therein, a specific weight percent of iron oxide, $Fe_3O_4$. The specific weight percent of uranium dioxide and iron oxide, $Fe_3O_4$, is shown for each anode. The anode for cell No. 4 consists of an intimate dispersion of nickel and stabilized zirconia as discussed above.

In Table I, the cathode for cells Nos. 1, 2, 3 and 4 each consists of stabilized zirconia, at least partially dissolved therein, a specific weight percent of uranium dioxide and, at least partially dissolved therein, a specific weight percent of iron oxide, $Fe_3O_4$. The specific weight percent of uranium dioxide and iron oxide, $Fe_3O_4$, is shown for each cathode.

TABLE I

| Cell No. | Electrolyte | Anode | Cathode |
|---|---|---|---|
| 1 | Calcia stabilized $ZrO_2$ | 10% $UO_2$, 5% $Fe_3O_4$ | 10% $UO_2$, 5% $Fe_3O_4$ |
| 2 | do | 20% $UO_2$, 5% $Fe_3O_4$ | 20% $UO_2$, 5% $Fe_3O_4$ |
| 3 | Yttria stabilized $ZrO_2$ | 20% $UO_2$, 5% $Fe_3O_4$ | 20% $UO_2$, 5% $Fe_3O_4$ |
| 4 | do | Nickel-$ZrO_2$ | 20% $UO_2$, 5% $Fe_3O_4$ |

TABLE II

| Cell No. | Fuel | Oxidant | Time operated (days) |
|---|---|---|---|
| 1 | $H_2$ | Air | 3 |
| 2 | $H_2$ | Air | 58 |
| 3 | $H_2$ | Air | 1 |
| 4 | $H_2$ | Air | 110 |

TABLE III

| Cell No. | Load voltage (v.) | Current density (ma./cm.²) |
|---|---|---|
| 1 | 0.5 | 12 |
| 2 | 0.5 | 205 |
| 3 | 0.5 | 200 |
| 4 | 0.5 | 690 |

While other modifications of this invention and variations thereof which may be employed within the scope of the invention have not been described, the invention is intended to include such as may be embraced within the following claims.

What I claim as new and desire to secure by Letters Patent of the United States is:

1. In an electrical device for operation at temperatures in excess of about 600° C., said device comprising a solid anode layer and a solid cathode layer as the electrodes separated by and in direct contact with a layer of a sintered solid oxide-ion electrolyte selected from the group consisting of stabilized zirconia and doped thoria, the improvement wherein at least one electrode is (a) substantially nonporous, (b) tightly adherent to the electrolyte layer, and (c) consists of solid oxide-ion material selected from the above-mentioned group having at least partially dissolved therein 2 weight percent to 40 weight percent of uranium dioxide and a metal oxide selected from the group consisting of iron oxide, cobalt oxide, nickel oxide, titanium oxide, zinc oxide, titanium oxide-iron oxide, zinc oxide-iron oxide and zinc oxide-lead oxide.

2. The improvement substantially as recited in claim 1 wherein the oxide-ion material is stabilized zirconia and the metal oxide is iron oxide in an amount ranging from 2 weight percent to 20 weight percent of the mixture.

3. In a fuel cell for operation at temperatures in excess of about 600° C., said fuel cell comprising a solid anode layer and a solid cathode layer as the electrodes separated by and in direct contact with a layer of a sintered solid oxide-ion electrolyte selected from the group consisting of stabilized zirconia and doped thoria, the improvement wherein at least one electrode is (a) substantially nonporous, (b) tightly adherent to the electrolyte layer, and (c) consists of solid oxide-ion material selected from the above-mentioned group having at least partially dissolved therein 2 weight percent to 40 weight percent of uranium dioxide and a metal oxide selected from the group consisting of iron oxide, cobalt oxide, nickel oxide, titanium oxide, zinc oxide, titanium oxide-iron oxide, zinc oxide-iron oxide and zinc oxide-lead oxide.

4. The improvement substantially as recited in claim 3 wherein the oxide-ion material is stabilized zirconia and the metal oxide is iron oxide in an amount ranging from 2 weight percent to 20 weight percent of the mixture.

References Cited

UNITED STATES PATENTS

| 3,138,487 | 6/1964 | Tragert | 136—86 X |
| 3,160,527 | 12/1964 | Hess | 136—86 |
| 3,281,273 | 10/1966 | Oser | 136—86 |
| 3,300,344 | 1/1967 | Bray et al. | 136—86 |

FOREIGN PATENTS

| 22,030 | 10/1961 | Germany. |
| 626,316 | 8/1961 | Canada. |

WINSTON A. DOUGLAS, *Primary Examiner.*

O. CRUTCHFIELD, *Assistant Examiner.*

U.S. Cl. X.R.

106—57; 136—120; 252—517, 518, 519, 520